United States Patent [19]
Brown

[11] 3,926,056
[45] Dec. 16, 1975

[54] CONDUCTIVITY, TEMPERATURE AND PRESSURE MEASURING SYSTEM

[75] Inventor: Neil L. Brown, Falmouth, Mass.

[73] Assignee: The United States of America as represented by the Secretary of the Navy, Washington, D.C.

[22] Filed: Sept. 26, 1974

[21] Appl. No.: 509,508

[52] U.S. Cl. ............ 73/398 AR; 73/345; 324/57 R; 324/99 D; 324/DIG. 1
[51] Int. Cl.² .......................................... G01L 9/04
[58] Field of Search .......... 73/345, 398 AR, 398 C; 324/99 R, 99 D, 140 R, 140 D, DIG. 1, 57 R

[56] References Cited
UNITED STATES PATENTS

| | | | |
|---|---|---|---|
| 2,342,947 | 2/1944 | Lingel | 324/140 |
| 3,221,247 | 11/1975 | Samuelian | 324/61 |
| 3,443,226 | 5/1969 | Knight | 324/99 |
| 3,548,662 | 12/1970 | Brandau et al. | 73/398 |
| 3,753,373 | 8/1973 | Brown | 73/398 |

OTHER PUBLICATIONS

Wheatstone Bridge Transducer Equations by Perino in Statham Instrument Co. Journal, Feb. 1966.

*Primary Examiner*—Herbert Goldstein
*Attorney, Agent, or Firm*—R. S. Sciascia; L. I. Shrago

[57] ABSTRACT

A profiler for measuring ocean conductivity, temperature and depth employs A.C. excited sensors with the ratio of each output signal to the input signal being indicative of the parameter being measured. Each sensor has an interface circuit which amplifies the output signal to a level sufficient to permit its transformation to a 16-bit signal by an analog-to-digital converter having a quadrature balancing provision that cancels the signal component caused by the A.C. excitation. The digital signals in frequency shift form are sent to the surface for processing.

5 Claims, 5 Drawing Figures

CONDUCTIVITY, TEMPERATURE AND PRESSURE MEASURING SYSTEM

The present invention relates generally to apparatus for and methods of measuring conductivity, temperature and pressure so as to determine the variation of temperature and salinity of seawater with depth.

Oceanographic surveys made with continuous profiling instruments have revealed the presence of temperature and salinity variations in the ocean that are much finer than those anticipated. To investigate these microstructures, extremely accurate temperature, pressure and conductivity measurements must be made.

Instruments presently available for measuring these parameters do not have either the long-term accuracy, the required spacial resolution or the high data rate capacity needed for this purpose. Additionally, most of these profilers make use of analog computers at the subsurface site which introduce significant systematic errors that limit the absolute accuracy of, for example, the salinity determination. Also, these computers have calibration procedures which are complicated and time consuming.

With the development of inexpensive and reliable on-board digital computers, the necessity for incorporating analog computers into the underwater unit of the measuring system has been eliminated. Thus, this unit can be designed to merely provide a digital stream of data to the shipboard data processing equipment.

It is, accordingly, a primary object of the present invention to provide a highly accurate system for measuring ocean conductivity, temperature and pressure which has a high sampling rate and high resolution.

Another object of the present invention is to provide a conductivity, temperature and pressure measuring system wherein all of the sensors are A.C. excited and wherein the ratio of the sensor output to input is linearly proportional to the parameter being measured.

Another object of the present invention is to provide a conductivity, temperature and pressure measuring system wherein the sensor output to input voltage ratios are converted to a 16-bit digital signal.

Another object of the present invention is to provide a digital-to-analog converter for use in a conductivity, temperature and depth measuring system which has a provision for balancing out the quadrature component present as a result of the A.C. energization of the sensors.

Another object of the present invention is to provide a sensor interface circuit for use with either a temperature, pressure or conductivity bridge so as to match the characteristics of the various sensors to a 16-bit digitizer.

Briefly, and in general terms, the above objects are accomplished, according to the present invention, by measuring ocean temperature, conductivity and pressure with appropriate sensors that are located in separate bridge circuits that are excited with an A.C. signal of known amplitude. Because of the limited excitation voltage available at the subsurface site, the output of each bridge must be significantly amplified by a factor of approximately 100 to provide the resolution desired and permit each parameter to be converted into a multi-bit digital signal. This amplification is accomplished in a so-called sensor interface circuit which functions to match the characteristics of the various sensors to the requirements of the digitizer. The amplifier has a closed loop gain of 100, and the feedback necessary to insure the required gain stability is realized by taking advantage of the fact that all sensor circuits operate at a single frequency, namely, 10 kHz.

The precise value of each parameter is determined by measuring the ratio of the sensor interface output voltage to input voltage. Thus, the absolute output voltage is not important.

In the operation of the overall system, an analog switch sequentially connects the outputs of the three interface circuits 30 times per second to a precision A.C. digitizer which performs the above ratio measurement. This digitizer includes a 10 kHz comparator which has a quadrature nulling feature for eliminating any error caused by the relatively high excitation frequency of the bridge circuits. The A.C. digitizer includes a digital-to-analog converter in the form of an electronically switched binary ratio transformer arrangement which performs as a voltage summing device. A complete scan of all three sensors is made in 30 ms, and the digital output of each scan is transmitted via cable to a shipboard unit in a format that uses frequency shift key (FSK) modulation.

Other objects, advantages and novel features of the invention will become apparent from the following detailed description of the invention when considered in conjunction with the accompanying drawings wherein.

Figure 1:
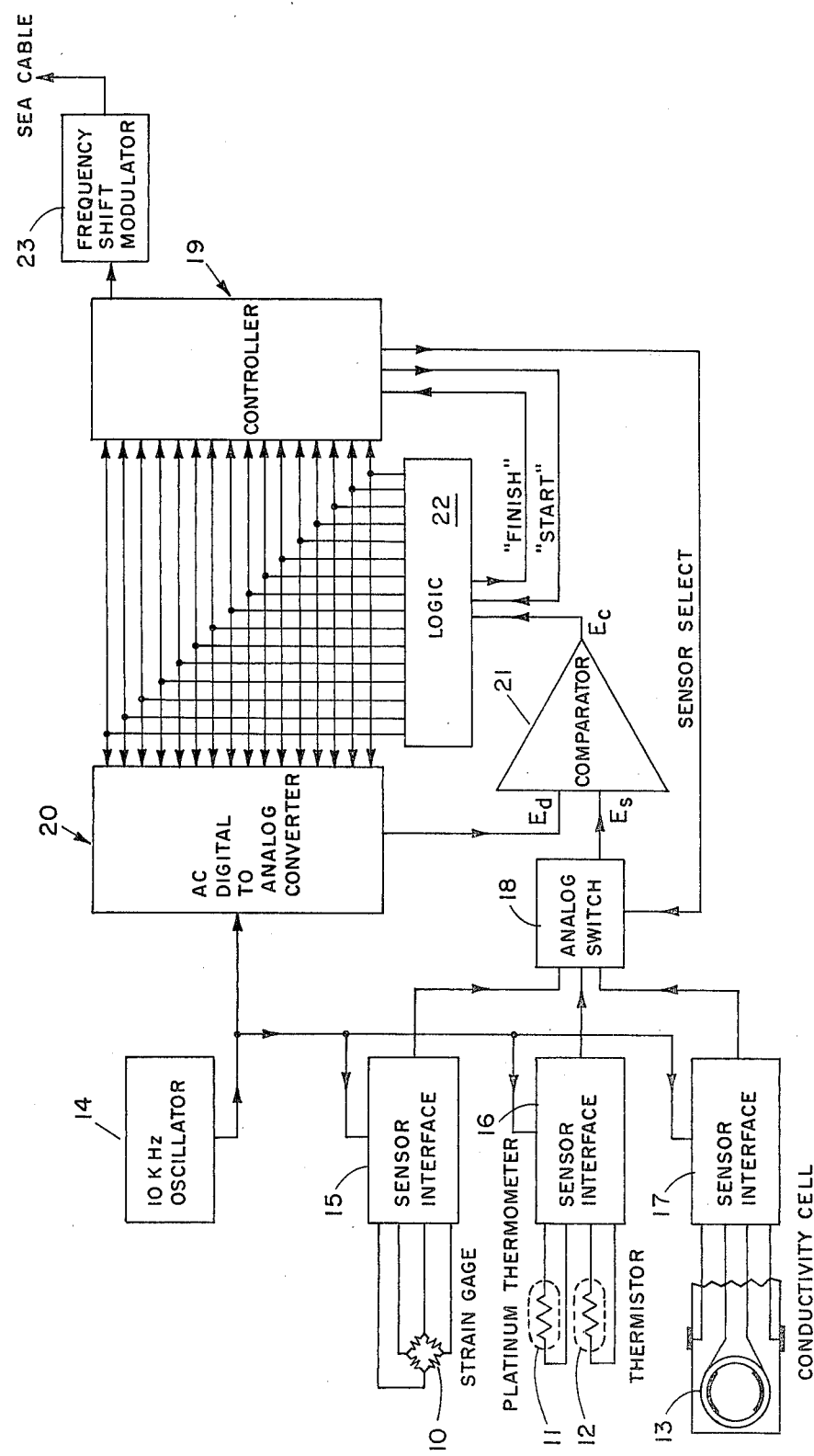
FIG. 1 is a schematic diagram of the subsurface unit of the conductivity, temperature and pressure profiler of the present invention.

Referring now to FIG. 1 of the drawings, which shows a complete schematic of the underwater unit of the CTD microprofiler of the present invention, it will be seen that the system includes a strain gage bridge 10 for sensing pressure, a first bridge 11 containing a platinum resistance thermometer for sensing temperature, a second bridge 12 containing a thermistor for also sensing temperature and for providing a complementary add-on signal for improving the response of the platinum element and a four-electrode cell for sensing conductivity. All sensor circuits are similarly excited by a 10 kHz signal of known amplitude obtained from source 14.

The details of the temperature bridges 11 and 12 and the four-electrode conductivity cell 13 and their interface circuits 16 and 17 are disclosed in applicant's co-pending applications, Serial Nos. 494,000, now U.S. Pat. No. 3,892,281, and 494,808, filed July 31, 1974, and Aug. 5, 1974, respectively. Consequently, the following discussion will be confined to the pressure sensing arrangement 10 and its cooperating interface circuit 15.

Figure 2:
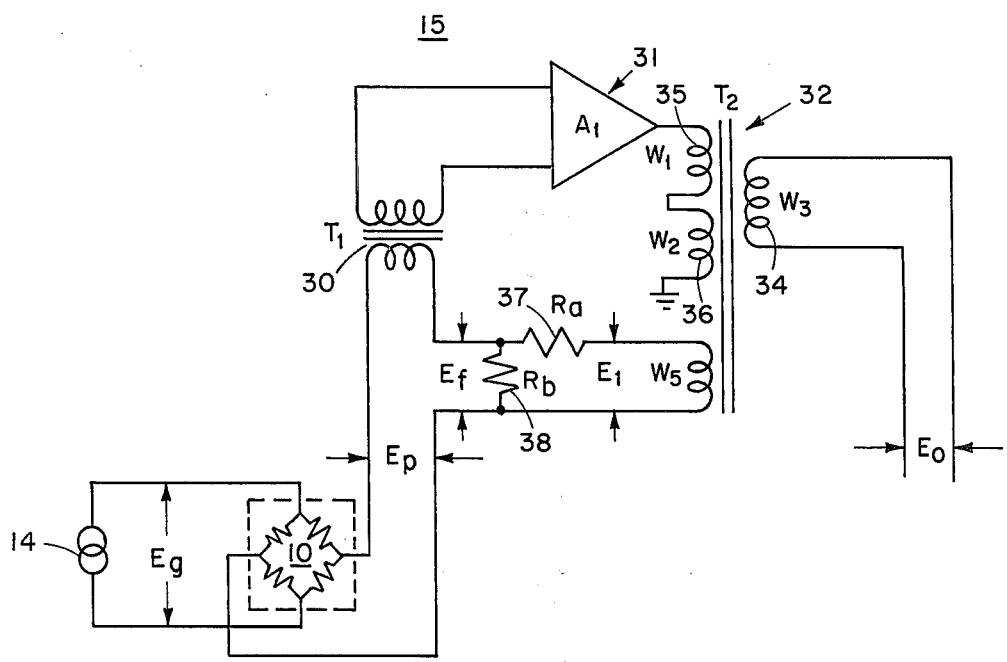
FIG. 2 shows the details of the sensor interface circuit.

Referring now to FIG. 2, which shows this portion of the system, the pressure sensor employed is a 350 ohm bonded wire strain gain bridge transducer 10. The remote excitation of this unit by source 14, however, is limited by power consumption considerations to 2 volts. Since its sensitivity is approximately 2.5 millivolts per volt, its output is 0 to 5 millivolts. If this output were to be translated into a 16-bit digital signal, a digitizer capable of resolving slightly less than 0.1 microvolts would be required. This is clearly impossible with conventional D.C. digitizer techniques. Consequently, as indicated hereinbefore, an A.C. system is used, and the necessary 500 millivolts input needed by the digitizer when the 16-bit number consists of all "ones" is obtained by subjecting the bridge output to a highly stabilized gain of approximately 100.

The A.C. output of the strain gage bridge 10, $E_p$, is transformer coupled by 30 to the input of amplifier 31. This amplifier which, as will be seen hereinafter, has two or more stages, contains an output transformer 32 with windings 33, 34, 35 and 36. Winding 33, designated $W_5$ is a feedback winding, and it develops across precision resistor 38, $R_b$, which is in series with a second precision resistor 37, $R_a$, a voltage, $E_f$, which opposes and cancels $E_p$, thus, balancing out the bridge signal. The output of the interface circuit, $E_o$, appears across winding 34, designated $W_3$.

As mentioned hereinbefore, the precise value of the pressure is determined by measuring the ratio of the sensor interface output voltage, $E_o$ to the input voltage, $E_g$. This ratio is linearly related to pressure and, consequently, changes in the absolute value of $E_g$ or $E_o$ are not significant.

The circuit operation can be explained as follows:
If we assume that $A_1$ has infinite gain, we can reason that:
$$E_F = E_p$$
$$= P \cdot K_1 \cdot E_g \quad (K_1 = \text{Press. transducer calibration constant})$$
Also $$E_F E_l \cdot \frac{R_B}{R_A + R_B}$$

$$= E_o \cdot \frac{W_5}{W_3} \cdot \frac{R_B}{R_A + R_B}$$

i.e.

$$\frac{E_o}{E_g} = P \cdot K_1 \left( \frac{W_3}{W_5} \cdot \frac{R_A + R_B}{R_B} \right)$$

Transformer $T_2$ is designed to have a very stable voltage ratio, and resistances $R_A$ and $R_B$ are chosen to have extremely high stability. Consequently, we can say as follows:

$$\frac{E_o}{E_g} = P \cdot K$$

where $$K = K_1 \left( \frac{W_3}{W_5} \cdot \frac{R_A + R_B}{R_B} \right)$$

In the preceding analysis, it was assumed that the feedback amplifier had infinite gain at the 10 kHz operating frequency. However, the typical gain available is actually about 3 million from the input of transformer $T_1$ to the output of transformer $T_2$ at winding $W_3$. This corresponded to a feedback factor of 30,000 for a closed loop gain of 100.

The high open loop gain and the high feedback factor at 10 kHz imposes certain requirements on the phase and amplitude response of the feedback amplifier if closed loop oscillation is to be avoided. It can be readily shown that conventional operational amplifiers cannot be used in this application.

The amplifying circuit of the present invention, as mentioned hereinbefore, takes advantage of the fact that the high open loop gain is required only at a fixed operating frequency. As is well known, very high gain at any particular frequency can be achieved by the use of a single tuned circuit. However, at frequencies well above resonance, the gain, A, of a single tuned stage is given by $$A = \frac{Fr Ar}{QF}$$

where $Ar$ = gain at resonance; $Fr$ = resonant frequency; $Q$ = quality factor of the inductor; $F$ = frequency. For a feedback factor of 30,000 at resonance, and $Q = 50$ (typical) the frequency at which the feedback factor reduces to unity is given by $$Fl = \frac{30,000 \, Fr}{Q} = 6 \, mHz$$

Since the tuned circuit has a phase shift approaching 90° at frequencies well above or below resonance, the untuned stages including input and output transformers would need to have a total phase shift less than 90° for frequencies up to 6 mHz if the amplifier is to be unconditionally stable under closed loop conditions. This is, for practical purposes, an impossible design situation. The use of two tuned circuits in cascade would not solve this problem since the results would be a phase shift which rapidly approached ±180° above and below resonance.

Figure 3:
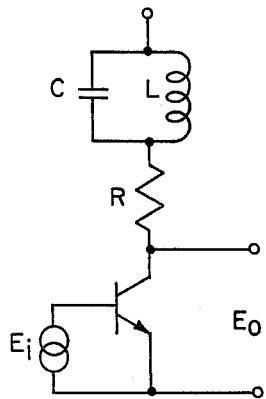
FIG. 3 illustrates one of the stages of the tuned amplifier utilized in the interface circuit.
Figure 4:
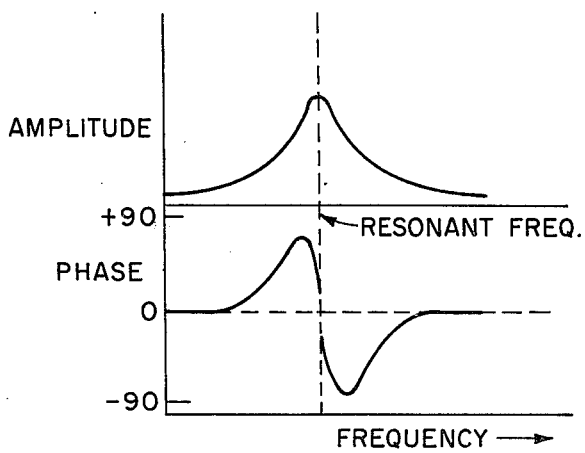
FIG. 4 shows the response of the amplifying stage of FIG. 3.

As shown in FIG. 3, the amplifying circuit of the present invention includes a tuned stage that has a series resistance. At resonance, the impedance of the tuned LC circuit is very high compared with this resistance. However, at frequencies remote from resonance either the inductance or capacitance of the tuned circuit tends to be short circuit leaving the series resistance as the dominant element. This has the advantage of a very high gain at resonance, as shown in FIG. 4, and zero phase shift at very high or very low frequencies. Thus, the amplifier, A, in FIG. 2 has two tuned stages, with one modified to include the above series resistance. With the proper choice of values of inductance, capacitance and resistance, this amplifier has a phase shift always less than 180° at frequencies where the feedback factor is greater than unity. Thus, the whole amplifier including the input and output transformers $T_1$ and $T_2$ of FIG. 2 is stable under closed loop conditions.

The very high feedback factor in the sensor interface circuit 15 and the use of input and output transformers result in high gain stability and extremely favorable efficiencies and signal-to-noise ratio.

Figure 5:
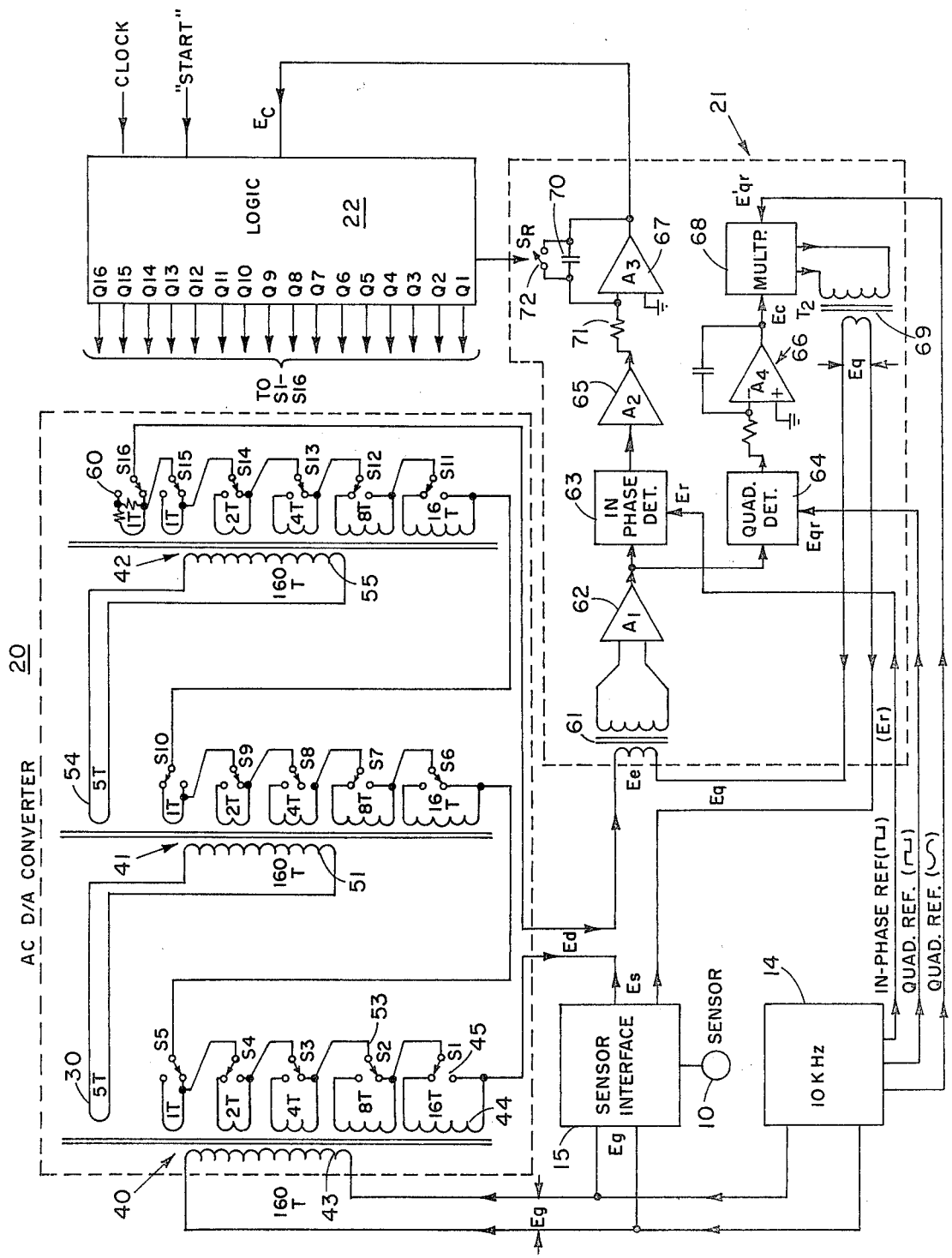
FIG. 5 is a schematic diagram of the A.C. digitizer and the comparator with the quadrature balancing provision.

As mentioned hereinbefore, the ratio of the sensor interface output voltage to input voltage must be measured in order to obtain a precise indication of each parameter C, T and D. FIG. 5 illustrates how this is performed by the A.C. digitizer, which consists of a 16-bit successive approximation A.C. D/A converter 20, an A.C. comparator 21 and a logic module 22.

From an examination of this Fig., it will be seen that the D/A converter 20 is a voltage summation device consisting of three transformers 40, 41 and 42, each having a primary winding 43, 51 and 55 of 160 turns. Primary 43 is connected to the 10 kHz generator 14 which also energizes the various sensor interface circuits. Primary winding 51 of the second transformer 41 is energized from a five-turn secondary winding 50 of transformer 40, while the primary winding 55 of the third transformer 42 is similarly energized from a five-turn winding 54 of transformer 41. Thus, there is a successive 32-to-1 reduction in the energization of transformers 41 and 42.

Each of the three transformers has a sixteen, eight, four, two and one-turn winding corresponding to five binary stages. The last transformer 42 has an additional one-turn winding 60 with a resistor divider across it to provide the sixteenth binary stage. Each of the secondary windings of the various transformers has a single-pole, double-throw, solid-state switch such as $S_1$ to $S_{16}$ for effectively connecting these windings into, or out of, the series summation circuit. Thus, the analog output voltage, $E_d$, of this circuit is proportional to the product of the input voltage, $E_g$, and a number N represented by the 16 binary inputs to the control switches $S_1$ to $S_{16}$. The setting of the individual switches is determined by logic 22, and the signals applied via lines $Q_1$ to $Q_{16}$ which interconnect these portions of the system. The output voltage at each winding is exactly half that of the preceding winding. Thus, the largest output voltage occurs across winding 44 of transformer 40 and successively 50 percent smaller voltages appear across the eight-turn, four-turn, two-turn and one-turn windings. This relationship prevails through the complete circuit so that the voltage appearing, for example, across the sixteen-turn winding of transformer 41 is half that appearing across the one-turn winding of transformer 40. The output voltage, $E_d$, is, therefore, the sum of the sixteen voltages selected by switches $S_1$ to $S_{16}$. The D/A converter shown, as mentioned hereinbefore, is a voltage summing device whereas conventional D/A converters utilizing resistance networks are effectively current summing devices. In the latter converter, the electronic switches employed to switch the various currents cause uncertainties as a result of the voltage drop across the finite resistance of the switches. This problem does not occur in the inductive type used in the present invention since there is no current flowing through the switches in normal use. Thus, whereas initial accuracy, long term drift and temperature variations become very severe for resistive 16-bit D/A converters, the ratio transformer type illustrated is inherently precise, stable and free of temperature and drift effects.

The process of digitization is initiated by a "start" command from controller 19 to logic 22, which immediately causes switch $S_1$ to effectively move to its upper position and switches $S_2$ through $S_{16}$ to their lower positions. The A.C. comparator 21, as shown in FIG. 1, now compares the analog voltage, $E_d$, which at this time corresponds only to the output voltage across the 16-turn winding of transformer 40, with the sensor interface voltage, $E_s$. If $E_s$ is smaller than $E_d$, the comparator output $E_c$, which is applied to logic 22, causes the next pulse from this logic to set $S_1$ to its lower position and $S_2$ to its higher position. Thus, the 16-turn winding is removed from the series circuit and replaced by the eight-turn winding alone. If, however, $E_s$ is larger than $E_d$, then $E_c$ causes the logic to leave $S_1$ in its higher position and set $S_2$ to a similar position. This sequence, it will be understood, is repeated until all the switches, $S_1$ through $S_{16}$, have been set by logic outputs $Q_1$ through $Q_{16}$. The binary output is then represented by the settings of $Q_1$ through $Q_{16}$.

At this point, the analog output of the D/A converter is equal to the sensor output and, consequently, no current flows through $S_1$ to $S_{16}$. Thus, the final balance is uneffected by the finite on resistance of these switches, which may be typically 20 ohms each.

The purpose of the A.C. comparator 21, as mentioned hereinbefore, is to indicate to the logic 22 whether the 10 kHz D/A output is greater or smaller than the sensor output. Consequently, as shown in FIG. 5, the input, $E_e$, to the comparator is the difference between $E_s$ and $E_d$.

To simplify the description of the comparator operation, it will be assumed initially that $E_s$ and $E_d$ are exactly in phase and that $E_q$, the quadrature component, equals zero. The difference voltage, $E_e$, will, thus, be in phase or 180° out of phase depending upon whether $E_s$ is greater to smaller than $E_d$. $E_e$ is coupled by transformer 61 to amplifier 62 and, thereafter, detected by detector 63. The resultant D.C. signal is further amplified by amplifier 65 and then applied to the input of a finite time integrator consisting of operational amplifier 67, feedback capacitor 70 and resistor 71. A reset switch 72 is connected across capacitor 70 and when momentarily closed by an appropriate signal, rezeros the integrator at the beginning of each clock pulse to the logic module 22.

The D.C. error signal including random noise at the output of amplifier 65 is integrated for the remainder of the clock period when switch 72 is open by logic 22 and the resultant output is then interpreted by the logic as either "high" or "low". The finite time integrator is, thus, used as an optimum filter having no "memory" of the error signal during the previous clock period. Hence, its response to a very small error signal is not impaired by being subjected to a very large error signal during the previous clock period.

Initially, it was assumed that $E_q$, the quadrature component, was zero and the $E_s$ was exactly in phase with $E_d$. In reality, there is usually a small phase difference between $E_s$ and $E_d$ due to the quadrature component mainly in the sensor signal $E_s$ as a result of the A.C. excitation of the bridge circuits. Theoretically, the in-phase detector 63 should not be sensitive to a quadrature component. However, if this component is large enough, the detector will be overloaded, and this will cause non-linear operation and erroneous response to small in-phase signals.

The quadrature component is detected by quadrature detector 64, which is similar to the in-phase detector 63 except that its reference signal is shifted 90° with respect to the reference signal applied to this detector. The latter reference signal is derived from source 14 and corresponds to a square wave at the 10 kHz frequency and in phase with $E_g$. Suitable wave forming circuits may be affiliated with the 10 kHz generator to produce these square reference signals.

The output of detector 64 is filtered in a second integrator 66, and the filtered output is applied to one input of a multiplier 68. The second input to this multiplier is a 10 kHz sine wave derived from source 14 and shifted 90° from the sensor input, $E_g$. Thus, the output from multiplier 68 will be 90° or 270° depending upon the polarity of $E_a$, the output from the filtering integrator.

The closed loop consisting of transformer 61, amplifier 62, quadrature detector 64, integrator 66, multiplier 68 and transformer 69 automatically balances the quadrature component of $E_e$ by making $E_q$ exactly equal and opposite. The performance of this portion of the system is essentially the same as the automatic balancing circuit utilized in the fast response circuit disclosed in FIG. 3 of applicant's co-pending application, Ser. No. 494,000, mentioned hereinbefore. In this connection, amplifier 62, quadrature detector 64, integrator 66 and multiplier 68 have their counterparts in amplifier 40, quadrature detector 41, integrator 43 and multiplier 39 in the above circuit. Consequently, the mathematical analysis set forth in this co-pending application may be consulted for an explanation as to how this balancing circuit neutralizes the quadrature component present in signal $E_s$.

Controller 19 carries out the following sequence of operations: At the start of a particular cycle, it sets selector switch 18 to a position which connects pressure sensor interface circuit 15 to the A.C. digitizer and issues a start command to this circuit. After it receives a signal indicating that the digitizing operation has been completed, it stores the 16-bit pressure word in a buffer memory. Thereafter, it selects the temperature sensor output and issues a new start command to the digitizer. Following this, it stores the 16-bit temperature word in its buffer memory and repeats the above steps with the conductivity sensor output. Finally, the pressure and temperature words in the memory and the conductivity word in the digitizer logic are parallel shifted to a 48-bit shift register. An appropriate ready signal then shifts this data to the frequency shift modulator 23, which sends it as FSK signals to the shipboard data processing apparatus via a sea cable.

In the showing of FIG. 2, pressure conditions in the fluid medium are sensed by the bonded wire strain gage bridge transducer 10. However, it should be understood that this function may be performed by any resistance type pressure sensitive device which may serve as one arm element of an appropriate bridge circuit. In one preferred embodiment of the invention, the strain gage bridge was manufactured by Standard Control Inc. Mod No. 211-35-090.

Although the details of the bridge circuit 11 containing the platinum thermometer which senses the temperature of the fluid medium are fully disclosed in applicant's co-pending application, Ser. No. 494,000, referred to hereinbefore, it might be mentioned at this time that this circuit has as its other arm components two windings of a ratio transformer and a reference resistor $R_F$. Thus, this bridge, which is also energized by signal source $E_g$, has a transformer input arrangement and does not utilize the direct coupling shown in FIG. 2 of the present application. The interface circuit used with this bridge is basically the same as that shown in FIG. 2. including the high gain amplifier and negative feedback loop.

The four-electrode conductivity cell, which is depicted in FIG. 1 in a functional manner, consists of a T-shaped member with one pair of external electrodes attached to opposite sides of the stem and another pair of internal electrodes attached to diametrically opposite arcuated portions of the inner wall surface of a tubular crosspiece which serves as the head of the cell. All electrodes are in the same vertical plane. The "voltage" electrodes of the cell, one external electrode and one internal electrode, are connected in the input of the high gain amplifier and the other pair of electrodes, the "current" electrodes, are connected in the feedback loop to provide the self-balancing operation present in the other interface circuits. The output signal is taken from a transformer which is associated with a second amplifier that is transformer coupled to the feedback loop.

What is claimed is:

1. In a system for measuring the pressure within a fluid medium, the combination of
   a strain gage bridge adapted to sense the pressure within said fluid medium,
     said bridge being excited with an AC input signal of a known constant amplitude and of a kHz frequency;
   a high-gain, multiple-stage amplifier having one of its stages tuned to said kHz frequency and having a negative feedback circuit;
   means for connecting the bridge output circuit to the input circuit of said amplifier such that the negative feedback signal equals and opposes the bridge output signal whereby said bridge and amplifier operate as a self-balancing circuit,
     the ratio of the amplitudes of the output signal of said amplifier and the A.C. input signal energizing said bridge when said balanced condition exists being proportional to the pressure then being sensed by said strain gage bridge; and
   means for producing from said A.C. input signal and the output signal of said amplifier an n-bit binary signal indicative of the value of said ratio.

2. In an arrangement as defined in claim 1 wherein said means for producing said n-bit binary signal includes a successive approximation digital-to-analog converter which develops an analog signal of said kHz frequency whose magnitude equals that of the output signal from said amplifier.

3. In an arrangement as defined in claim 2 wherein said means for producing said n-bit binary signal further includes a comparator that compares the bridge output signal with the analog signal developed by said digital-to-analog converter and produces therefrom a D.C. error signal indicative of any inequality therebetween,
   said comparator in its operation comparing both the in-phase and quadrature phase components of said bridge output signal and said analog signal.

4. In an arrangement as defined in claim 3 wherein said digital-to-analog converter further includes transformer means energized by said A.C. input signal and having $n$ secondary windings
   said secondary windings producing different output voltages whose magnitudes are related to the numerical values represented by said n-bit binary signal; and
   means for connecting selected ones of said secondary windings into a series circuit such that the summation output voltage existing across this series circuit equals the output voltage of said amplifier.

5. In an arrangement as defined in claim 4 wherein said means for connecting selected ones of said secondary windings in a series circuit includes $n$ two position switches
   each of said switches in one position being effective to connect a secondary winding into said series circuit and in the other position being effective to disconnect said secondary from said series circuit; and
means for sensing the positions of said switches and for generating an n-bit binary signal indicative of the individual settings of said switches.

* * * * *